April 2, 1935.   E. L. WALTERS   1,996,446
SHEET GLASS INSPECTION APPARATUS
Filed June 18, 1934   4 Sheets-Sheet 1
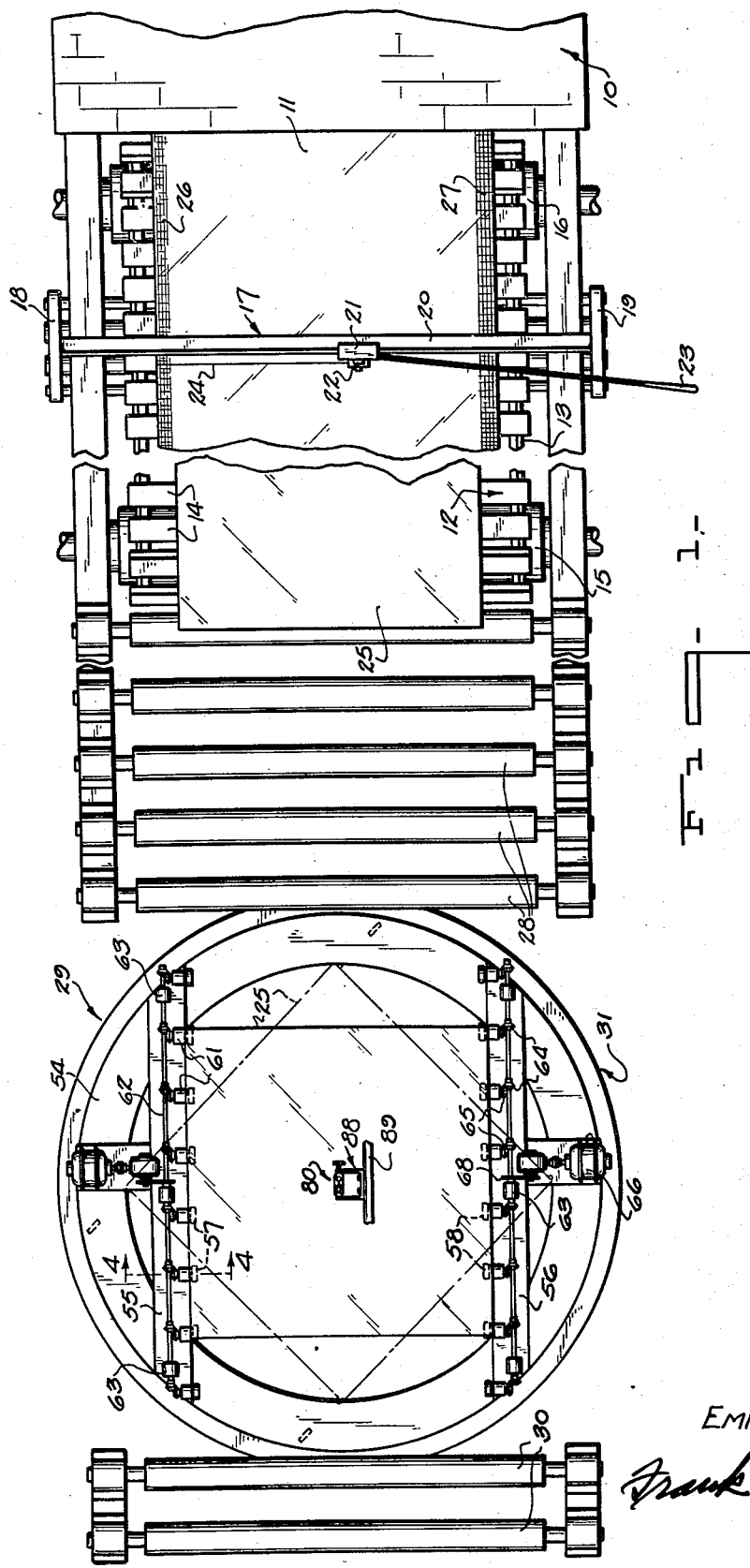
Inventor
EMMETT L. WALTERS.
Frank Fraser
Attorney

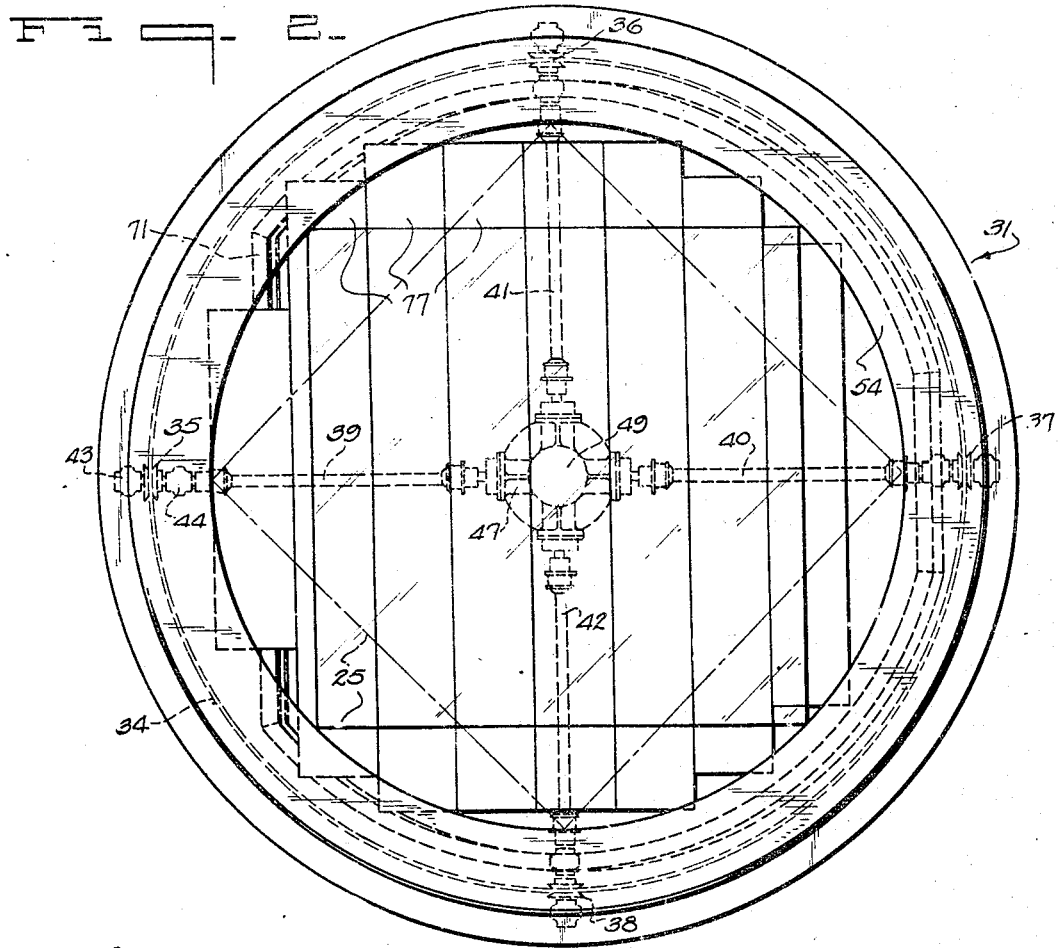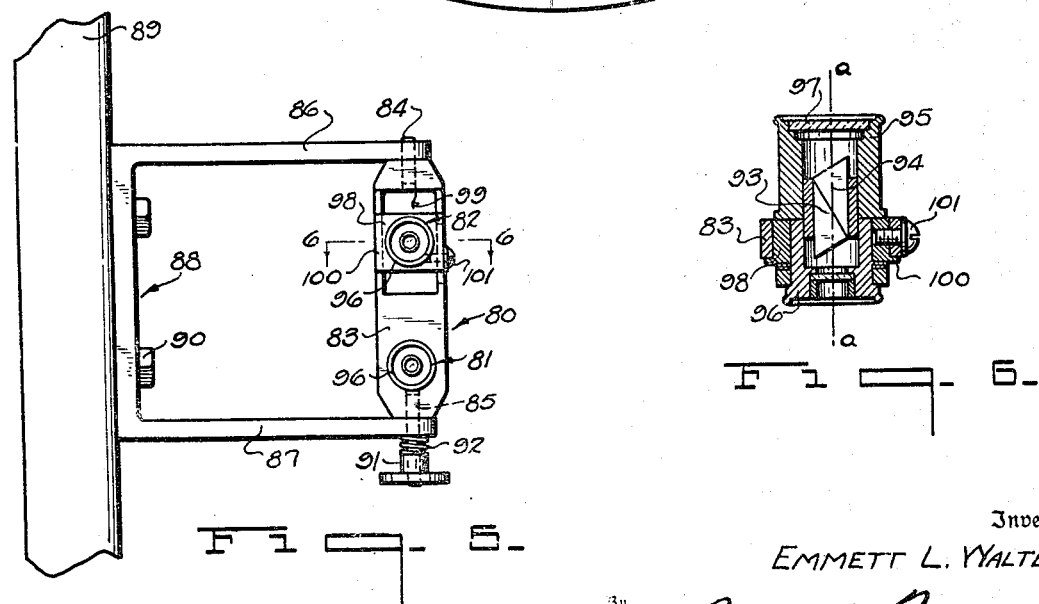

April 2, 1935.  E. L. WALTERS  1,996,446
SHEET GLASS INSPECTION APPARATUS
Filed June 18, 1934    4 Sheets-Sheet 3
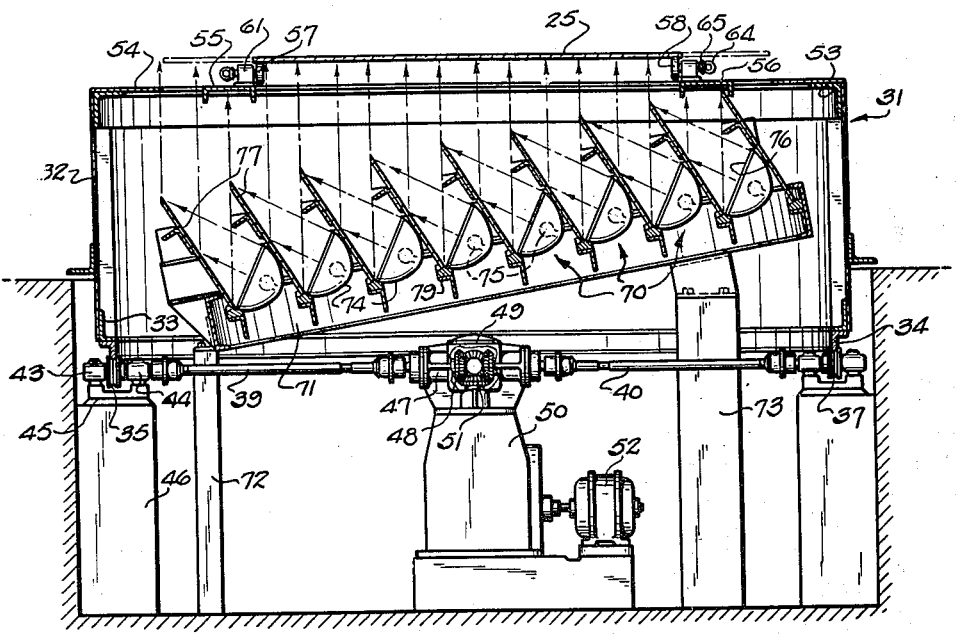
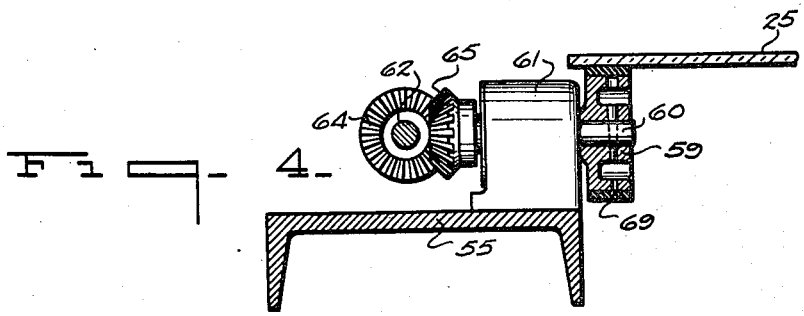
Inventor
EMMETT L. WALTERS.
By Frank Fraser
Attorney April 2, 1935.  E. L. WALTERS  1,996,446

SHEET GLASS INSPECTION APPARATUS

Filed June 18, 1934  4 Sheets-Sheet 4

Inventor
EMMETT L. WALTERS.
By Frank Fraser,
Attorney

Patented Apr. 2, 1935

1,996,446

UNITED STATES PATENT OFFICE 1,996,446

SHEET GLASS INSPECTION APPARATUS

Emmett L. Walters, Toledo, Ohio, assignor to Libbey-Owens-Ford Glass Company, Toledo, Ohio, a corporation of Ohio Application June 18, 1934, Serial No. 731,118

20 Claims. (Cl. 88—14)

The present invention relates broadly to inspection apparatus and more particularly to improvements in apparatus designed especially for use in the inspection of sheet glass.

This invention contemplates the provision of novel and improved means for inspecting sheet glass to determine the degree and location of strain, ream, and other defects therein and wherein the inspection of the glass is achieved by the use of polarized light. More particularly, according to the invention, polarized light is directed through the glass sheet and then passed through an analyzer. The rays of polarized light passing through the glass sheet and the analyzer, will vary in color and intensity, depending upon the conditions of strain, ream, and other defects in the glass so that an analysis of these light rays will serve to indicate the degree and location of the said defects.

Inasmuch as the nature of polarized light and its action are well known, it is not believed necessary to enter into a detailed explanation thereof. However, it might be stated briefly at this point that light which has been polarized vibrates in only a single plane, whereas common light has transverse vibrations in all planes.

The defects present in sheet glass do not always extend in the same direction and are apt to extend in any or all directions across the plane of the glass. It has been found that streaks or bands of ream or unhomogeneity in the glass are most noticeable when at an angle of 45 degrees in a lateral plane with respect to the vibrations of the polarized light. Therefore, because the aforementioned streaks or bands of unhomogeneity are apt to extend in any angle across the plane of the glass, it becomes necessary during the inspection of sheet glass to turn the sheet in its own plane to various angles so that all of the defects therein will pass through the desired 45 degree angle at sometime during turning and so be located and checked.

An important object of this invention resides in the provision of inspection apparatus of the above character by means of which sheet glass can be rapidly and conveniently inspected in a thorough and efficient manner.

Another object of the invention is the provision of inspection apparatus of the above character embodying means for supporting a glass sheet to be inspected in a substantially horizontal position and for turning the said sheet horizontally with respect to the analyzer so that all of the defects present therein, irrespective of the direction in which they may extend, will be plainly visible and can be readily detected and marked by the inspector, thereby resulting in and facilitating a complete and thorough inspection of the said sheet throughout its entire area.

A further object of the invention is the provision of inspection apparatus of the above character particularly designed for use in inspecting sheet glass as it comes from an annealing leer, although it is manifestly not limited to such use.

Other objects and advantages of the invention will become more apparent during the course of the following description when taken in connection with the accompanying drawings.

In the drawings wherein like numerals are employed to designate like parts throughout the same, Fig. 1 is a top plan view of inspection apparatus constructed in accordance with the present invention and illustrated in position to receive the glass from an annealing leer, Fig. 2 is a plan view of the inspection apparatus with the means for supporting the glass sheet thereupon omitted for the sake of clearness, Fig. 3 is a sectional view taken substantially on line 3—3 of Fig. 1.

Fig. 4 is a detail section taken substantially on line 4—4 of Fig. 1,

Fig. 5 is a plan view of the analyzing means,

Fig. 6 is a sectional view taken substantially on line 6—6 of Fig. 5 through one of the analyzers.

Figure 7:
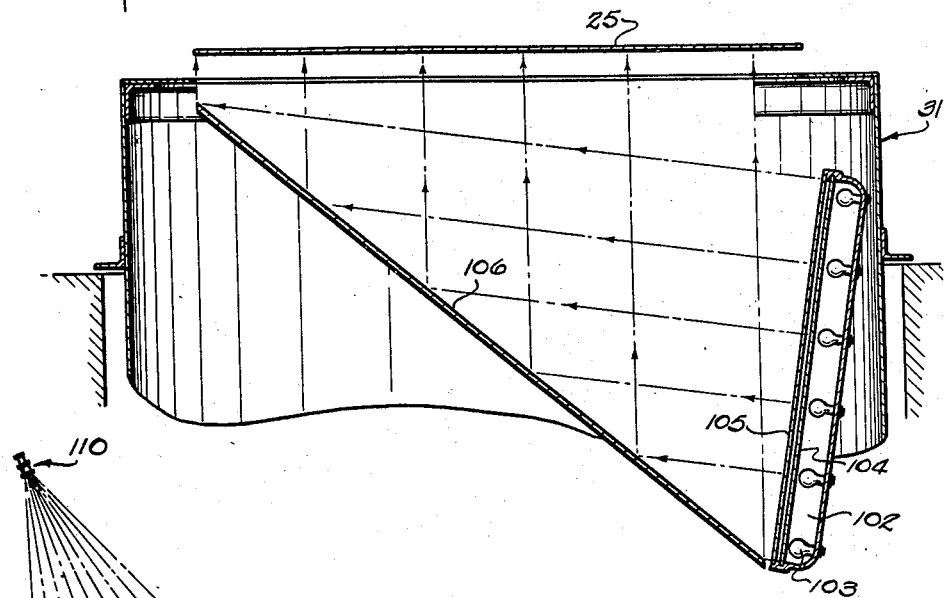
Fig. 7 is a longitudinal vertical sectional view of a modified form of polarizing means.

Referring now to the drawings and particularly to Fig. 1, the numeral 10 designates the outlet end of a horizontal annealing leer of any conventional or preferred construction and 11 a continuous sheet or ribbon of glass emerging therefrom. Positioned closely adjacent the outlet end of said leer, in a manner to receive the glass sheet therefrom and carry it forwardly, is a moving cutting or capping table 12 which travels in the same direction and at the same speed as the continuous sheet 11. This table may take a variety of forms but is here shown, by way of example, as comprising a plurality of spaced, parallel endless chains 13 carrying a series of transverse wooden blocks 14 which form, in the upper run of the chains, a flat even supporting surface for the glass sheet. The endless chains 13 are trained at the opposite ends of their loop about rollers or drums 15 and 16 and one of these drums may be positively driven in any preferred manner to move the table 12 in the proper direction and at the desired speed.

As the continuous sheet or ribbon of glass 11 emerges from the leer 10 upon capping table 12, it is adapted to be cut transversely into individual sheet sections of the desired length and for this purpose there may be provided the cutting mechanism designated in its entirety by the numeral 17. This cutting mechanism may be of any conventional or approved construction since the specific constructional details thereof form no part of the present invention. However, it is preferably of the general type disclosed in the patent to John L. Drake, No. 1,724,261, granted August 13, 1929, and is adapted for movement with the sheet during the transverse scoring thereof whereby to permit accurate cuts to the end that the ribbon of glass can be cut transversely either to size or substantially to size.

The cutting mechanism 17 herein disclosed embodies generally a pair of carriages 18 and 19 arranged at opposite sides of the endless capping table 12 and movable longitudinally thereof upon suitable tracks (not shown) but which are located beneath the upper horizontal run of said table. Extending transversely across the table and connecting the carriages 18 and 19 is a cutter guide member 20 upon which is slidably mounted a cutter carriage 21 carrying the cutter 22. The cutter carriage and cutter are movable along the cutter guide by an operating rod 23 and upon drawing of said cutter across and in contact with the continuous sheet 11, it is adapted to effect the scoring thereof as indicated at 24. The glass ribbon is then broken along the score line 24 in the well known manner to provide individual sheet sections, one of which is indicated at 25. Any suitable means may be employed for causing the cutting mechanism 17 to move with the glass sheet during the scoring of the latter.

In certain processes of producing continuous sheet glass, the sheet or ribbon of glass 11 is provided with roughened or thickened edge portions 26 and 27 and it is customary, after the sheet issues from the annealing leer, to trim off these roughened or thickened edge portions before removing the glass from the capping table. The edge portions can be trimmed either before or after the sheet has been cut transversely and it will be noted that these edge portions have been removed from the sheet section 25.

As the individual sheet sections 25 leave the capping table 12, they are received upon a plurality of horizontally aligned idler rolls 28 which serve to transport the glass to the novel and improved inspection apparatus provided by the present invention and designated in its entirety by the numeral 29. After being thoroughly inspected and marked while upon the inspection apparatus 29, the glass sheet can be removed therefrom onto a series of horizontally aligned rolls 30 and transported thereupon to any desired point.

With reference particularly to Figs. 1 to 6, the inspection apparatus disclosed therein includes a horizontally disposed cylindrical member or drum 31 of a diameter somewhat greater than the width of the glass sheet 25 to be inspected, said drum comprising a vertical annular side wall 32 to which is secured, adjacent the lower end thereof, a cylindrical angle member 33. Carried by this angle member is an annular rail 34 supported at four equi-distantly spaced points upon the four rollers 35, 36, 37 and 38, said rollers being preferably grooved to receive the rail therein and in this manner prevent accidental displacement of the drum.

The rollers 35 and 37 are mounted upon aligned horizontal shafts 39 and 40 respectively, while the rollers 36 and 38 are mounted upon aligned horizontal shafts 41 and 42 respectively which extend at right angles to the shafts 39 and 40. Each of the shafts 39 to 42 is journaled at its outer end in spaced bearings 43 and 44 carried by a supporting bracket 45 mounted upon a fixed support 46. The inner end portion of each shaft passes through a bearing 47 and has keyed thereto a bevel gear 48, the gears for the several shafts being located within a gear case 49 mounted upon the housing 50 which also carries the bearings 47. Meshing with the bevel gears 48 carried by the shafts 39 to 42 is a drive gear 51 driven from a motor 52 through suitable gears and shafts contained in the housing 50. Consequently, the rotation of the drive gear 51 will be imparted to the shafts 39 to 42 through the gears 48 whereby to effect the rotation of the supporting rollers 35 to 38 and cause the drum 31 to be turned in the desired direction.

Secured to the inner surface of the drum 31, adjacent the upper end thereof, is an annular angle member 53 carrying an annular horizontal plate 54. Supported upon this plate are the spaced parallel channel beams 55 and 56 upon which are mounted a series of rollers 57 and 58 respectively for supporting the glass sheet 25 to be inspected thereon. The two series of rollers 57 and 58 are arranged parallel with one another while the rollers of each series are in horizontal alignment. Each of the rollers, as shown in Fig. 4, comprises a metal body portion 59 keyed to the projecting end portion of a horizontal pin 60 journaled in the bearing 61 fixed to the respective channel beam 55 or 56. The bearings 61 upon each channel beam are arranged in alignment with one another and are adapted to be driven from a line shaft 62 journaled in bearings 63, said shaft having keyed thereto a plurality of bevel gears 64, one being provided for each roller and adapted to mesh with a corresponding bevel gear 65 keyed to the respective pin 60.

Each line shaft 62 is driven from a motor 66 through suitable reduction gearing contained in the housing 67 and a chain and sprocket drive 68. Manifestly, however, the invention is not limited to the use of the particular means disclosed for driving the shafts 62. The metal body portion 59 of each roller 57 and 58 is preferably covered with a rubber sleeve or collar 69 to prevent scratching or marring of the glass sheet as it moves thereover.

The means herein provided for polarizing the light is arranged within the drum 31 beneath the glass sheet 25 to be inspected so that the polarized rays of light are directed vertically upward through the glass sheet to the analyzer which is mounted above said sheet. The polarizing means illustrated in Figs. 2 and 3 comprises a series of polarizing units 70 arranged side by side within the drum 31. These units are carried by a box or other suitable supporting means 71 mounted at one end upon posts 72 and at its opposite end upon standards 73 so that the series of polarizing units incline from one end to the opposite end thereof. Each polarizing unit 70 comprises an elongated reflector 74 containing a plurality of incandescent lamps 75. Carried by each reflector and disposed in front of the lamps is a sheet of frosted or sand-blasted glass 76 which serves to diffuse the light from the lamps. The sheet of glass 76 is inclined to the vertical and arranged in opposition thereto and oppositely inclined is a rectangular polarizing reflector 77 preferably consisting of a sheet or slab of black glass. This glass is practically opaque and is provided with a polished surface so that it forms a good reflector. The reflector is also placed at such an angle that the light from the lamps will be polarized, the polarized rays being reflected vertically upward through the glass sheet 25, the arrows in Fig. 3 showing the propagation of the polarized light through the sheet of glass.

The reflectors 77 are carried intermediate their upper and lower edges by angle irons 78 and are also supported at their lower edges upon the horizontal strip 79. The several polarizing units 70 are arranged parallel with one another and cooperate to give a large area of light. As best shown in Fig. 2, the polarizing reflectors 77 may be of different lengths but are so arranged as to produce an area of light sufficient to cover the entire sheet of glass 25.

Mounted above the drum 31 at substantially the axis of rotation thereof is the means for analyzing the polarized light reflected upwardly through the glass sheet. This analyzing means is designated in its entirety by the numeral 80 and consists of a pair of analyzers 81 and 82 (Fig. 5) carried by a substantially rectangular supporting plate 83 provided at its opposite ends with trunnions 84 and 85 loosely received within the arms 86 and 87 respectively of a bracket 88 which is secured to a fixed supporting member 89 by screws or the like 90. It is preferred that two analyzers be employed so that the inspector may observe the glass sheet with both eyes. The supporting plate 83 can be rocked upon the trunnions 84 and 85 to move the analyzers into different positions to facilitate the inspection of the glass. Threaded upon the outer end of trunnion 85 is a finger piece 91 and interposed between the said finger piece and arm 87 of bracket 88 is a compression spring 92 which serves to maintain the plate 83 and likewise the analyzers 81 and 82 in adjusted position.

The analyzers 78 and 79 are of the ordinary type as indicated in Fig. 6 carrying a Nicol prism consisting of the two crystals 93 and 94 supported in a rotatable sleeve 95 so that the prism may be adjusted about its axis a. The sleeve 95 carries at one end thereof an eye piece 96 and at its opposite end a mica quarter wave or selenite plate 97 which, while preferably used, is not absolutely essential.

The analyzer 81 is stationarily mounted upon the supporting plate 83 while the analyzer 82 is movable toward and away from analyzer 81 to best fit the observer's eyes. Thus, the rotatable sleeve 95 of analyzer 82 may be rotatably mounted in a substantially square block 98 slidably received within an elongated guideway 99 in supporting plate 83, said block being provided with a flange 100 which rests upon the top of the said supporting plate. The analyzer 82 can be held in adjusted position by means of a screw 101 which does not however interfere with the rotation of the analyzer.

As brought out hereinabove, in the case of polarized light the vibrations are all in one plane which is transverse to the direction of the rays. Therefore, before the polarized light passes through the glass sheet 25, it vibrates in only a single predetermined plane. On the other hand, the analyzing Nicols are adjusted to pass light which is vibrating only in a plane at right angles to the vibrations of the polarized light. Therefore, when the sheet of glass 25 is removed from the inspection apparatus and all angles of propagation of the rays of polarized light are correct, no light can be seen through the analyzers. However, when the glass sheet to be inspected is placed in position, light will be refracted as it passes through the glass due to the presence of strain, ream, or other defects therein, as a result of which the plane of vibration of the light will be changed so that it can be observed through the analyzers. In other words, any defects which are present in the glass sheet will cause a refraction of the rays of polarized light resulting in their vibration in a plane approaching right angles to the plane of vibration of the polarized light and these rays can then be observed through the analyzers. The rays of light passing through the glass sheet to the analyzer will vary in color (when using the quarter-wave or selenite plate) and intensity, depending upon the conditions of strain, ream, and other defects in the glass, and the colors and/or intensities as observed through the analyzers at different points across the sheet will indicate the condition of the glass with respect to strain, ream, etc. and any variation in these conditions is readily observed through the analyzers.

As brought out above, the defects present in sheet glass do not always extend in the same direction and defects are most noticeable when at an angle of 45 degrees with the vibrations of the polarized light. For instance, unhomogeneity in the same plane as the polarized light or at an angle of 90 degrees thereto is not visible. On the other hand, it is most easily seen when it extends at an angle of 45 degrees with respect to the polarized light. Therefore, in order to observe all ream, unhomogeneity, and other defects in the glass, the drum 31 is adapted to be slowly rotated while the inspector locates and marks the defects in the sheet. By rotating the glass sheet during inspection, all of the defects therein, irrespective of the direction in which they might extend, will be plainly visible in the analyzers and can be easily detected and marked by the inspector. Also, by supporting the glass sheet 25 at opposite edges thereof only upon the rollers 57 and 58, it will be apparent that there will be no obstruction to the rays of polarized light directed upwardly, in consequence of which the entire body portion of the sheet will be uniformly illuminated. As a result, the glass sheet can be rapidly and conveniently inspected throughout its entire area in a thorough and efficient manner.

In Fig. 7 is illustrated the usual form of polarizing means which may be incorporated in the apparatus. In this case, the polarizing means consists of a single large polarizing unit instead of a plurality of relatively smaller units as disclosed in Fig. 3. This polarizing unit includes a closed in Fig. 3 light chamber 102 containing a number of incandescent lamps 103. Arranged in front of the lamps are the spaced diffusing plates or screens 104 and 105, while positioned in opposition to the diffusing screens is a single, relatively large polarizing reflector 106 disposed at the proper angle to cause the light from the lamps 103 to be polarized and reflected vertically upward through the glass sheet 25 as indicated by the arrows. While this arrangement may be of some advantage in certain specific instances, the arrangement disclosed in Fig. 3 is preferred. Thus, the use of a single large polarizing surface, as shown in Fig. 7, is very costly and very expensive to replace as well as being clumsy to mount. On the other hand, by employing a series of relatively small polarizing units as in Fig. 3, the system is much more compact and more efficient because of the shorter distance required for the light to travel before reaching the glass sheet. Moreover, the use of a plurality of small polarizing units provides cheaper cost than a single unit of sufficient size to give the required area of polarized light; also ease of maintenance and a better cooling condition in dissipating the heat generated by the lamps.

Figure 8:
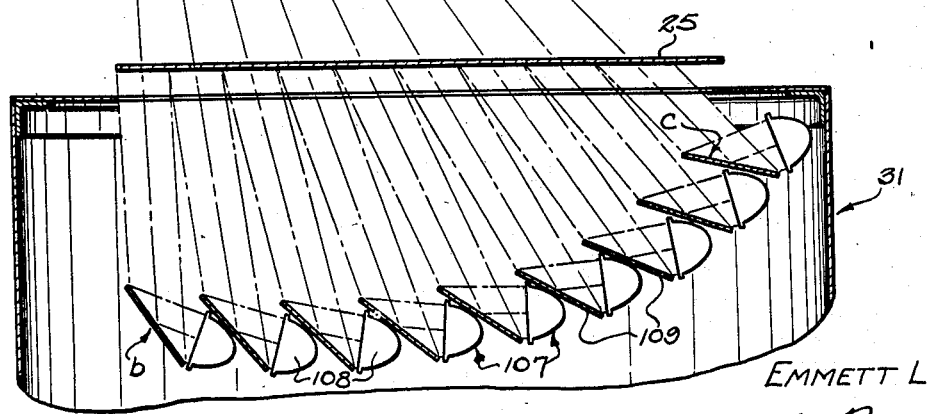
Fig. 8 is a similar view showing still another type of polarizing means.

In Fig. 8, the polarizing means also consists of a plurality of relatively small polarizing units 107, each comprising a source of light 108 and a polarizing reflector 109. In this arrangement, however, the polarizing surfaces of the reflectors 109 are located in such a manner that the beams of light from the center of each surface converge at a point above and to one side edge of the glass sheet being inspected. The analyzer 110 is adapted to be located at this apex or, in other words, at the meeting line of the beams of polarized light. With this arrangement, the inspection of the glass is rendered somewhat easier than when the analyzing device is arranged directly above the glass sheet as disclosed in Fig. 1. It will be noted that the angle of inclination of the polarizing reflectors 109 of the polarizing units 107 gradually decreases from the reflector b to the reflector c, the reflector b being arranged at substantially a 60 degree angle to the horizontal while reflector c is arranged at an angle of approximately 10 degrees to the horizontal. However, the reflectors are so arranged that the angle of reflection of the rays of light from each reflector will be substantially the same.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In an inspection apparatus for sheet glass, movable means for supporting the sheet to be inspected in a substantially horizontal position, light polarizing means located beneath said sheet for directing polarized light upwardly therethrough, an analyzer located above the sheet to receive the polarized light directed upwardly, and means for turning said supporting means and the sheet carried thereby horizontally relative to the light polarizing means.

2. In an inspection apparatus for sheet glass, a rotatable bed for supporting the sheet to be inspected in a substantially horizontal position, a light polarizing device located beneath said sheet for reflecting polarized light upwardly therethrough, an analyzer located above the sheet to receive the polarized light reflected upwardly, and means for rotating said bed to turn the sheet horizontally relative to the polarizing device.

3. In an inspection apparatus for sheet glass, movable means for supporting the sheet to be inspected in a substantially horizontal position, light polarizing means located beneath said sheet and including a source of illumination, an inclined polarizing reflector arranged in opposition to the source of illumination in position to receive the light therefrom and reflect the polarized portion thereof upwardly through the glass sheet, an analyzer located above the sheet to receive the polarized light reflected upwardly, and means for turning said supporting means and the sheet carried thereby horizontally relative to the light polarizing means.

4. In an inspection apparatus for sheet glass, a rotatable bed for supporting the sheet to be inspected in a substantially horizontal position, light polarizing means located beneath said sheet and including a source of illumination, an inclined polarizing reflector arranged in opposition to the source of illumination in position to receive the light therefrom and reflect the polarized portion thereof upwardly through the glass sheet, an analyzer located above the sheet to receive the polarized light reflected upwardly, and means for rotating said bed to turn the sheet horizontally relative to the light polarizing means.

5. In an inspection apparatus for sheet glass, a substantially cylindrical member rotatable about a substantially vertical axis, means carried by said member for supporting the glass sheet to be inspected in a substantially horizontal position, light polarizing means arranged within the cylindrical member beneath said sheet for directing polarized light upwardly therethrough, an analyzer located above the sheet to receive the polarized light directed upwardly, and means for rotating said cylindrical member to turn the sheet horizontally relative to the light polarizing means.

6. In an inspection apparatus for sheet glass, a substantially cylindrical member rotatable about a substantially vertical axis, means carried by said member for supporting the glass sheet to be inspected in a substantially horizontal position, light polarizing means arranged within the cylindrical member beneath said sheet and including a source of illumination, an inclined polarizing reflector arranged in opposition to the source of illumination in position to receive the light therefrom and reflect the polarized portion thereof upwardly through the glass sheet, an analyzer located above the sheet to receive the polarized light reflected upwardly, and means for rotating said cylindrical member to turn the sheet horizontally relative to the light polarizing means.

7. In an inspection apparatus for sheet glass, a member rotatable about a substantially horizontal axis, means carried by said member for supporting the glass sheet to be inspected in a substantially horizontal position at opposite edges thereof only, light polarizing means arranged beneath said sheet for directing polarized light upwardly therethrough, an analyzer located above the sheet to receive the polarized light directed upwardly, and means for rotating said member to turn the sheet horizontally relative to the light polarizing means.

8. In an inspection apparatus for sheet glass, a member rotatable about a substantially horizontal axis, means carried by said member for supporting the glass sheet to be inspected in a substantially horizontal position at opposite edges thereof only, light polarizing means located beneath said sheet and including a source of illumination, an inclined polarizing reflector arranged in opposition to the source of illumination in position to receive the light therefrom and reflect the polarized portion thereof upwardly through the glass sheet, an analyzer located above the sheet to receive the light reflected upwardly, and means for rotating said member to turn the sheet horizontally relative to the light polarizing means.

9. In an inspection apparatus for sheet glass, a substantially cylindrical member rotatable about a substantially vertical axis, two series of spaced parallel rollers carried upon the top of said member and adapted to support the glass sheet to be inspected in a horizontal position at opposite edges thereof only, light polarizing means arranged within the cylindrical member beneath said sheet for directing polarized light upwardly therethrough, an analyzer located above the sheet to receive the polarized light directed upwardly, and means for rotating said cylindrical member to turn the sheet horizontally relative to the light polarizing means.

10. In an inspection apparatus for sheet glass, a substantially cylindrical member rotatable about a substantially vertical axis, two series of spaced parallel rollers carried upon the top of said member and adapted to support the glass sheet to be inspected in a horizontal position at opposite edges thereof only, light polarizing means arranged within the cylindrical member beneath said sheet and including a source of illumination, an inclined polarizing reflector arranged in opposition to the source of illumination in position to receive the light therefrom and reflect the polarized portion thereof upwardly through the glass sheet, an analyzer located above the sheet to receive the polarized light reflected upwardly, and means for rotating said cylindrical member to turn the sheet horizontally relative to the light polarizing means.

11. In an inspection apparatus for sheet glass, a movable bed for supporting the sheet to be inspected in a substantially horizontal position thereupon, light polarizing means located beneath said sheet for directing polarized light upwardly therethrough including a plurality of polarizing units arranged side by side and cooperating to provide an area of light sufficient to illuminate substantially the entire sheet, an analyzer located above the sheet to receive the polarized light directed upwardly, and means for turning said bed and sheet horizontally relative to the light polarizing means.

12. In an inspection apparatus for sheet glass, a movable bed for supporting the sheet to be inspected in a substantially horizontal position thereupon, light polarizing means located beneath said sheet for directing polarized light upwardly therethrough including a plurality of polarizing units arranged side by side and cooperating to provide an area of light sufficient to illuminate substantially the entire sheet, each polarizing unit comprising a source of illumination, an inclined polarizing reflector arranged in opposition to the source of illumination in position to receive the light therefrom and reflect the polarized portion thereof upwardly through the glass sheet, an analyzer located above the sheet to receive the polarized light reflected upwardly, and means for turning said bed and sheet horizontally relative to the light polarizing means.

13. In an inspection apparatus for sheet glass, a rotatable bed for supporting the sheet to be inspected in a substantially horizontal position, light polarizing means located beneath the sheet and including a plurality of polarizing units arranged side by side and cooperating to provide an area of light sufficient to illuminate substantially the entire sheet, an analyzer located above the sheet to receive the polarized light directed upwardly, and means for rotating said bed to turn the sheet horizontally relative to the light polarizing means.

14. In an inspection apparatus for sheet glass, a rotatable bed for supporting the sheet to be inspected in a substantially horizontal position, light polarizing means located beneath said sheet including a plurality of polarizing units arranged side by side and cooperating to provide an area of light sufficient to illuminate substantially the entire sheet, each polarizing unit comprising a source of illumination, an inclined polarizing reflector arranged in opposition to the source of illumination in position to receive the light therefrom and reflect the polarized portion thereof upwardly through the glass sheet, an analyzer located above the sheet to receive the polarized light reflected upwardly, and means for rotating said bed to turn the sheet horizontally relative to the light polarizing means.

15. In an inspection apparatus for sheet glass, a substantially cylindrical member rotatable about a substantially vertical axis, means carried by said member for supporting the glass sheet to be inspected in a substantially horizontal position, light polarizing means arranged within the cylindrical member beneath said sheet for directing polarized light upwardly therethrough including a plurality of polarizing units arranged side by side and cooperating to provide an area of light sufficient to illuminate substantially the entire sheet, an analyzer located above the sheet to receive the polarized light directed upwardly, and means for rotating said cylindrical member to turn the sheet horizontally relative to the light polarizing means.

16. In an inspection apparatus for sheet glass, a substantially cylindrical member rotatable about a substantially vertical axis, means carried by said member for supporting the glass sheet to be inspected in a substantially horizontal position, light polarizing means arranged within the cylindrical member beneath said sheet for directing polarized light upwardly therethrough including a plurality of polarizing units arranged side by side and cooperating to provide an area of light sufficient to illuminate substantially the entire sheet, each unit comprising a source of illumination, an inclined polarizing reflector arranged in opposition to the source of illumination in position to receive the light therefrom and reflect the polarized portion thereof upwardly through the glass sheet, an analyzer located above the sheet to receive the polarized light reflected upwardly, and means for rotating said cylindrical member to turn the sheet horizontally relative to the light polarizing means.

17. In an inspection apparatus for sheet glass, a rotatable member, means carried by said member for supporting the glass sheet to be inspected in a horizontal position at the opposite edges thereof only, light polarizing means located beneath said sheet for directing polarized light upwardly therethrough including a plurality of polarizing units arranged side by side and cooperating to provide an area of light sufficient to cover substantially the entire sheet, an analyzer located above the sheet to receive the polarized light directed upwardly, and means for rotating said member to turn the sheet horizontally relative to the light polarizing means.

18. In an inspection apparatus for sheet glass, a rotatable member, means carried by said member for supporting the glass sheet to be inspected in a horizontal position at the opposite edges thereof only, light polarizing means located beneath said sheet for directing polarized light upwardly therethrough including a plurality of polarizing units arranged side by side, each unit comprising a source of illumination, an inclined polarizing reflector arranged in opposition to the source of illumination in position to receive the light therefrom and reflect the polarized portion thereof upwardly through the glass sheet, said units cooperating to provide an area of light sufficient to cover substantially the entire sheet, an analyzer located above the sheet to receive the polarized light reflected upwardly, and means for rotating said member to turn the sheet horizontally relative to the light polarizing means.

19. In an inspection apparatus for sheet glass, a rotatable bed for supporting the glass sheet to be inspected in a substantially horizontal position thereupon, light polarizing means arranged beneath said sheet and including a plurality of polarizing units arranged side by side, each unit comprising a source of illumination, an inclined polarizing reflector arranged in opposition to the source of illumination in position to receive the light therefrom and reflect the polarized portion thereof upwardly through the glass sheet, the polarizing surfaces of said reflectors being arranged in substantially parallel relation with respect to one another and cooperating to provide an area of light sufficient to illuminate substantially the entire sheet, an analyzer located above the sheet to receive the polarized light reflected upwardly, and means for rotating said bed to turn the sheet horizontally relative to the light polarizing means.

20. In an inspection apparatus for sheet glass, a rotatable bed for supporting the glass sheet to be inspected in a substantially horizontal position thereupon, light polarizing means arranged beneath said sheet and including a plurality of polarizing units arranged side by side, each unit comprising a source of illumination, an inclined polarizing reflector arranged in opposition to the source of illumination in position to receive the light therefrom and reflect the polarized portion thereof upwardly through the glass sheet, the polarizing surfaces of said reflectors being arranged so that the beams of light from the center of each surface converge at a point above and to one side edge of the glass sheet, an analyzer located above the sheet at the meeting line of the beams of polarized light, and means for rotating said bed to turn the sheet horizontally relative to the light polarizing means.

EMMETT L. WALTERS.